United States Patent [19]

Nilsson

[11] Patent Number: 5,556,602
[45] Date of Patent: Sep. 17, 1996

[54] DEVICE IN A REACTOR FOR GASIFYING SPENT LIQUOR

[75] Inventor: Bengt Nilsson, Skoghall, Sweden

[73] Assignee: Chemrec Aktiebolag, Karlstad, Sweden

[21] Appl. No.: 325,365

[22] PCT Filed: May 10, 1993

[86] PCT No.: PCT/SE93/00406

§ 371 Date: Oct. 26, 1994

§ 102(e) Date: Oct. 26, 1994

[87] PCT Pub. No.: WO93/23502

PCT Pub. Date: Nov. 25, 1993

[30] Foreign Application Priority Data

May 19, 1992 [SE] Sweden .................. 9201561

[51] Int. Cl.$^6$ .................................. D21C 11/00
[52] U.S. Cl. ................... 422/185; 422/227; 422/228
[58] Field of Search ................... 422/185, 224, 422/227, 228, 230; 261/2, 108, 110, 111, 112.1, 114.1; 55/220, 244, 245, 247, 256

[56] References Cited

U.S. PATENT DOCUMENTS 1,380,067  5/1921  Koch et al. ............... 422/227 X
2,871,108  1/1959  Knapp ....................... 422/228
3,271,117  9/1966  Leatham et al. .......... 422/227 X
4,842,831  6/1989  Yabumoto et al. ........ 422/227 X

FOREIGN PATENT DOCUMENTS

374028  2/1975  Sweden .
9119042  12/1991  WIPO .

Primary Examiner—Robert J. Warden
Assistant Examiner—Krisanne M. Thornton
Attorney, Agent, or Firm—Cushman Darby & Cushman, L.L.P.

[57] ABSTRACT

This invention relates to a device for thermal decomposition of stock, especially a spent liquor obtained from pulp manufacture, where the gas stream formed in this connection passes through a liquid bath. The decomposition device has a reactor with a chamber in which thermal decomposition takes place, and a separation zone including a liquid bath for separating off components contained in the gas stream leaving the chamber. The separation zone includes a housing for the liquid bath and a tipping chute arranged adjacent the outlet of the chamber, so that the tipping chute at least partially increases in cross-sectional area in the direction of flow of the gas stream.

9 Claims, 8 Drawing Sheets

DEVICE IN A REACTOR FOR GASIFYING SPENT LIQUOR

TECHNICAL BACKGROUND

The present invention relates to a device for thermal decomposition of stock, especially a spent liquor obtained from pulp manufacture, where the gas stream formed in this connection contacts a liquid bath, in which smelt particles are separated from the gas. The device comprises a reactor and a housing for the said liquid bath inside which a tipping chute, which is connected to the outlet of the reactor chamber, discharges.

STATE OF THE ART AND PROBLEMS

In the production of pulp, spent liquors are generated which contain both inorganic and organic compounds. It is desirable to recover the inorganic compounds, in order to produce new digestion liquid, and to extract fuel energy from the organic compounds. A special method for achieving this is described in WO-A-SE 91/00383. Instead of the conventional recovery boiler, a gasification reactor is used in which thermal decomposition of the spent liquor takes place under conditions of sub-stoichiometric oxygen supply, so that a large amount of combustible gases (CO, $H_2$, $CH_4$, $H_2S$, etc.) is produced in the reactor. The fuel energy in these gases can then be employed in a flexible manner, for example for steam generation or for gas turbine operation.

However, during the thermal decomposition, a mixture is formed of the said gases and finely-suspended inorganic components. The inorganic components must be separated from the gas stream before the gas can be used as a multi-purpose fuel. According to the above mentioned known method, the main separation takes place in a liquid bath which is arranged in direct connection to the reactor outlet. Using a tipping chute, whose lower end discharges into the liquid bath and whose upper end is arranged at the outlet of the reactor chamber, the gases are conducted down into the liquid bath, in which liquid bath the said main separation occurs.

By means of a follow-up treatment of the liquid in the liquid bath, the inorganic components can be recovered for renewed use. The gas is also subjected to a follow-up treatment before it is utilised as fuel. Included in the latter follow-up treatment are heat exchange of the combustible gases to extract the physical heat (thermal energy) they possess, and also scrubber treatment.

Liquid is added both to avoid problems resulting from depositions of solidified smelt at the outlet of the reactor chamber, and also to protect the inner surface of the tipping chute both from chemical attack and from high temperature. An additional arrangement in association with the outlet of the reactor chamber consists of cooling loops which are arranged on the outer surface of the bottom cone.

It is evident to the person skilled in the art that both these arrangements are relatively comprehensive and expensive, as a result of the separate pumping, piping and controlling systems which are necessary, for which reason it is desirable to avoid these completely. A further problem is that small alkali particles (in the form of fumes) are not separated off in a known kind of quench.

SOLUTION AND ADVANTAGES

An object of the following invention is to present a reactor in which the above mentioned disadvantages are eliminated. The invention also provides the advantage that a greater flow of liquid on the inner wall of the tipping chute can be obtained, which implies that stronger instantaneous cooling, so-called quench cooling, of gas and smelt drops can be obtained, as can improved dissolution of the smelt particles already in transit down through the tipping chute. Secondly it is an object to present a reactor which does not possess special arrangements comprising piping, pumps and control equipment for supplying liquid inside the tipping chute or for cooling the bottom cone of the reactor chamber.

The above mentioned object is achieved using a device for thermal decomposition of stock, especially a spent liquor obtained from pulp manufacture, where the gas stream formed in this connection contacts a liquid bath, which device comprises a reactor with a chamber for the said thermal decomposition and a separation zone including a liquid bath for separating off components contained in the gas stream leaving the chamber, where the said separation zone comprises a housing for the said liquid bath and a tipping chute arranged in association with the outlet of the chamber, characterised in that said tipping chute at least partly has an increasing cross-sectional area in the direction of flow of said gas stream.

By means of the invention a desired cooling of the bottom cone may be achieved in combination with a desired flow of liquid through the tipping chute. Moreover the invention provides for that it eliminates the need for expensive equipment.

Other advantages of the invention are that the improved circulation provides speedier and more effective cooling of the gas and that formation of encrustations is counteracted. Additionally, the genesis of "fumes" (very small particles 0.1–1 μm) is counteracted and/or very probably eliminated, since the gas with its content of chemicals is cooled and wetted by the liquid supply immediately after the reactor outlet, which leads to instantaneous condensation or absorption of the sodium content.

BRIEF DESCRIPTION OF THE FIGURES

The invention will be explained in more detail below with reference to the attached figures, in which.

Figure 1:
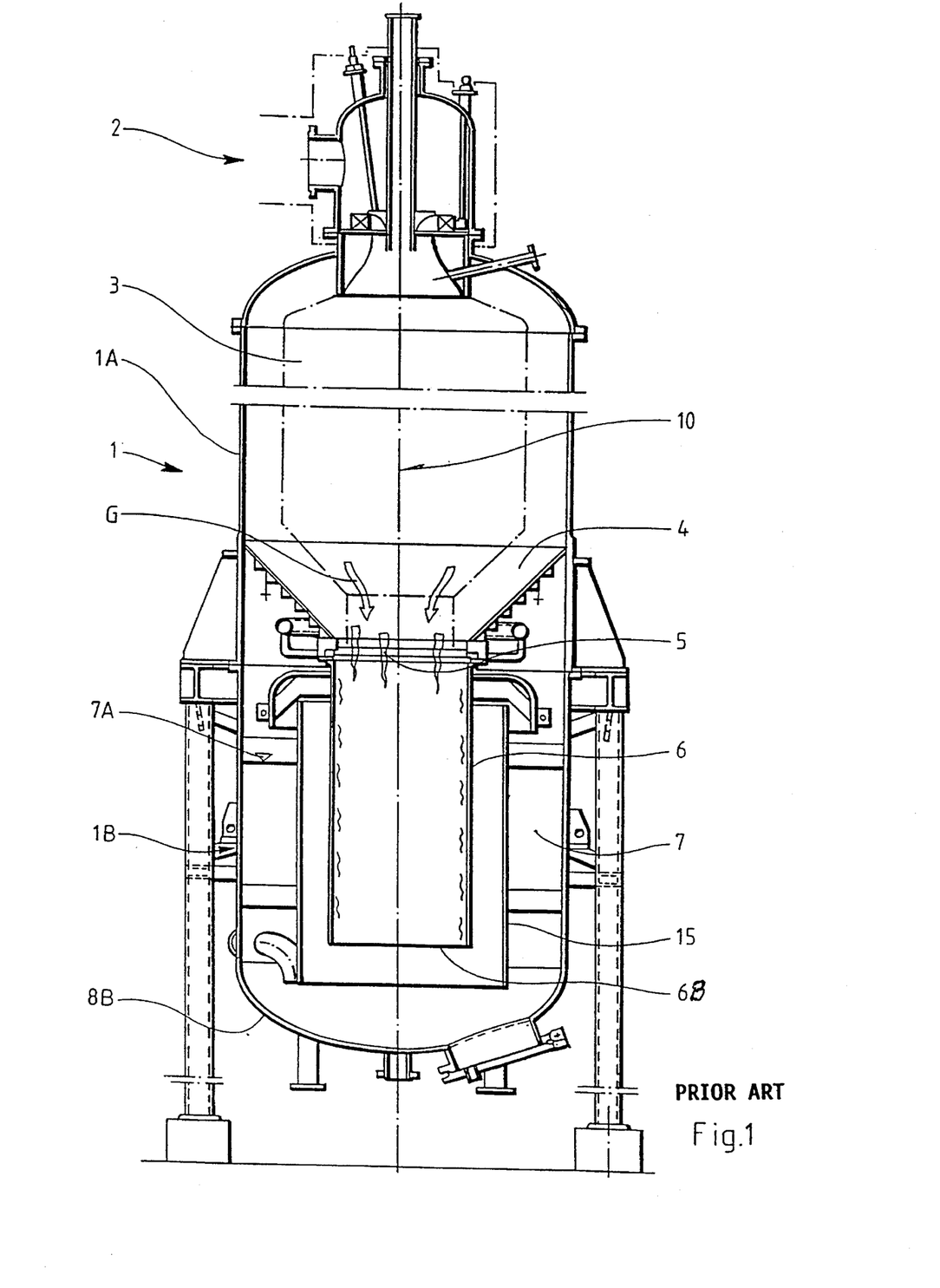
FIG. 1 shows a reactor according to known technology in cross-section

FIG. 1 shows a cross-section in the vertical direction of a known reactor 1 for gasifying black liquor. The reactor comprises an upper part 1A with a chamber 3 inside which thermal decomposition takes place of the black liquor introduced through the inlet part 2. During this thermal decomposition, a gas G is produced containing finely divided inorganic smelt particles. This gas then passes out through the lower outlet orifice 5 of the chamber 3. The lower part 1B of the reactor 1 constitutes a part for cooling, partial dissolution and separation for the hot gas with inorganic particle content flowing out from the outlet orifice 5.

The lower part 1B comprises a housing 8B inside which a liquid bath 7 is maintained. The gas G is conveyed down into the liquid bath 7 by means of a tipping chute 6 which is arranged with its upper end at the outlet orifice 5 of the chamber 3. The gas is led down into the liquid bath by the opening 6B of the tipping chute discharging underneath the surface 7A of the liquid bath. In the liquid bath 7, the gas is forced to move along a given path using an ascending pipe 15 which is arranged outside the tipping chute 6. In the liquid bath 7, the gas is cooled and the inorganic components are dissolved in the liquid and separated from the gas. The gas purified in this manner is then led out of the reactor 1 via a pipe conduit (not shown). The inlet to the latter pipe conduit is arranged in the lower part 1B of the reactor, somewhere above the surface 7A of the liquid bath.

Figure 2:
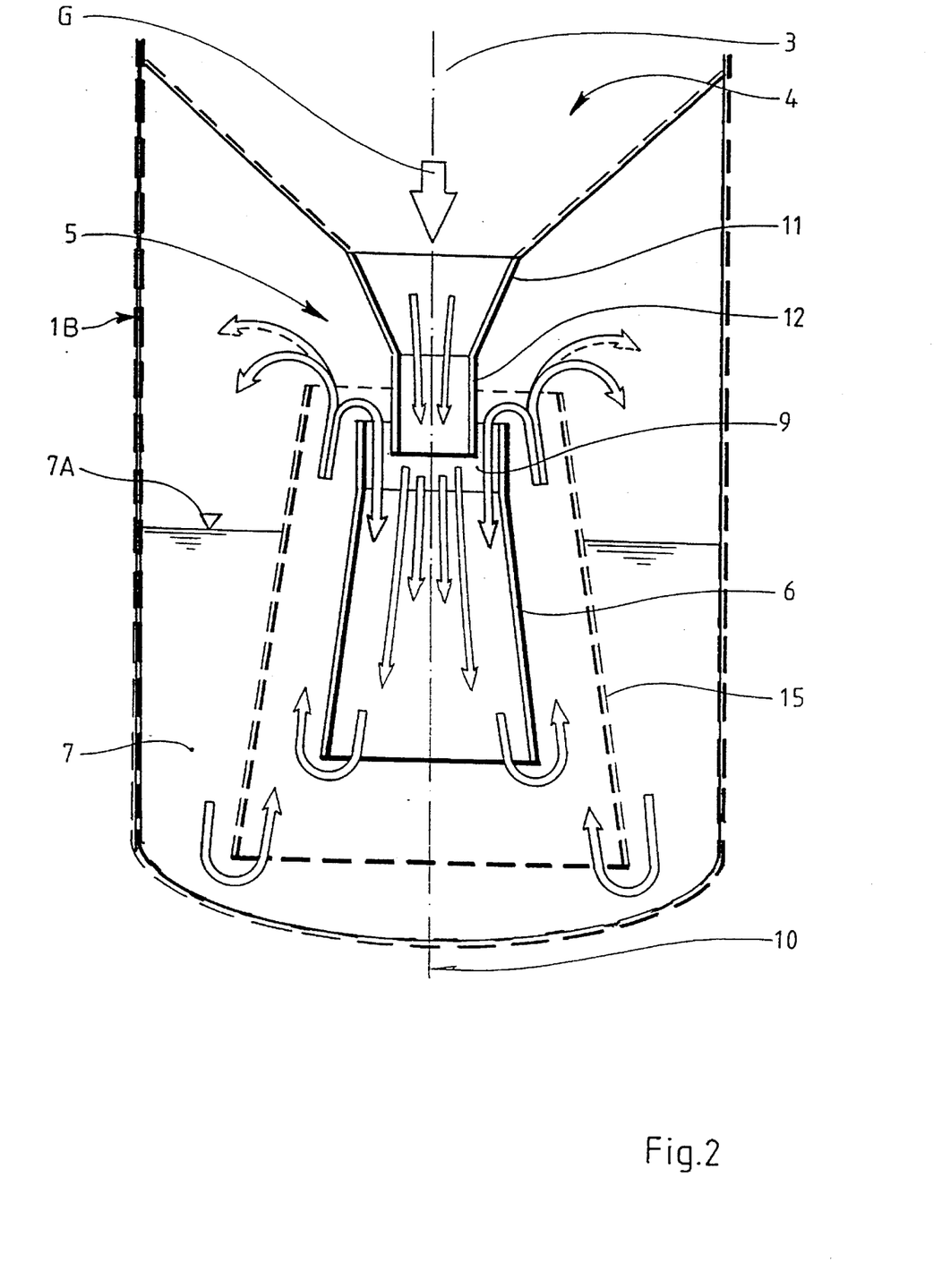
FIG. 2 shows diagrammatically the lower part of a reactor comprising a device according to the invention.

FIG. 2 shows an outline diagram of a device according to the invention. The outer broken line indicates the bottom part 1B of the reactor, inside which is found the liquid bath 7. In addition, the figure shows the lower part of the reactor chamber 3, which has a ceramic lining, its bottom part 4 and in particular its outlet section 5. This section 5 consists of a conical upper part 11 at which is arranged a cylindrical orifice part 12. Coaxially in relation to the said outlet section 5, there is arranged a tipping chute 6. The upper section of the tipping chute is cylindrical and arranged to overlap in relation to the cylindrical part 12 of the outlet section 5. Between the tipping chute 6 and the cylindrical orifice part 12 a ring-shaped gap 9 is formed. As a result of being able to move the tipping chute 6 in the vertical direction, the size of the gap can be regulated. When this is done, the upper end of the tipping chute 6 comes, in an upper extreme position, into contact with the outside of the conical section 11 of the outlet section 5 of the chamber, so that there is no gap between these two parts. By moving the tipping chute downwards from this extreme position, the size of the gap can consequently be gradually increased.

As a result of the ejector effect from the gases passing out through the outlet section 5, the liquid in and around the gap is caused to circulate, in accordance with the Venturi effect, which can be derived from Bernoulli's equation. By additionally arranging an ascending pipe 15 outside the tipping chute 6, a so-called "mammoth pump effect" is additionally obtained, which effect creates a very favourable circulation in the liquid bath, so that the gases which are passing out are cooled quickly and the inorganic particles simultaneously separated out. By regulating the ring gap, the flow of liquid in the liquid bath may consequently be regulated so that a desired portion flows into the tipping chute 6 and another desired portion flows up along the outside of the bottom cone 4 of the reactor chamber 3, as has been indicated by the flow arrows in the diagram.

Figure 3:
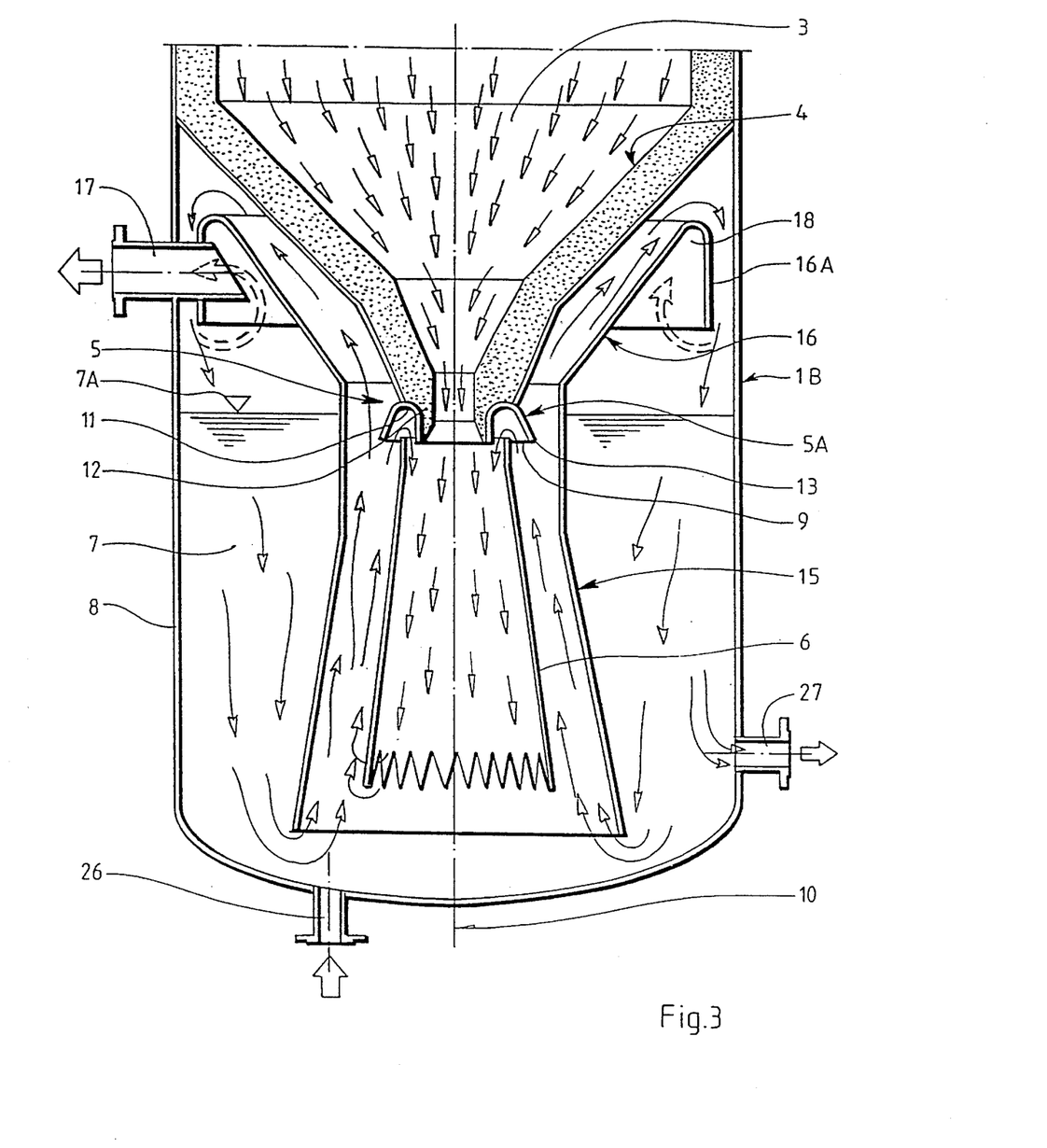
FIG. 3 shows the lower part of a reactor arranged with a first embodiment of a device according to the invention.

FIG. 3 shows a preferred embodiment of the bottom part 1B of a reactor according to the invention. Accordingly, the figure shows the lower part of the reactor chamber 3 and its orifice section 5 which is arranged concentrically in relation to the conical bottom section and has cylindrical orifice part 12. Encircling the end of the orifice there is arranged a U-shaped ring element 5A which is U-shaped in cross-section and which is positioned so that the shanks essentially extend along the centre line 10 of the reactor 1. As a result of the curve in the bottom section of this U-shaped ring element 5A, a delimitation surface 64 is formed which determines the size of the gap 9 in relation to the upper edge of the tipping chute 6. The outer shank 13 of the U-shaped ring element 5A forms a collar-like part which divides the liquid flow rising upwards between the tipping chute 6 and the ascending pipe 15 into a stream which passes into the tipping chute 6 and a stream which passes upwards towards the outside of the bottom section 4 of the gasification chamber 3. The amount of the flow going in one direction or the other is determined primarily by the size of the gap, the speed of the exiting gas and the prevailing pressure conditions. The size of the gap is determined, as has already been described, by the tipping chute 6 being movably arranged (not shown) along the centre line 10.

In this example, a very favourable flow is obtained for cooling the bottom cone 4 owing to a collar element 16 which has been arranged on top of the ascending pipe 15. This collar element 16 extends for a substantial distance along the bottom cone and with about the same conicity as the bottom section 4. In this way the liquid is obliged to flow up along the bottom cone 4. For gas removal there is arranged a pipe conduit 17 whose inlet opens in a pocket 18 between the collar 16, arranged on the ascending pipe 15, and a downwardly-directed flange 16A at the upper end of this collar. Addition of new liquid suitably takes place through an inlet 26 which is arranged to open out in the vicinity of the lower ring gap between the ascending pipe 15 and the tipping chute 6. Removal of liquid from the liquid bath 7 is suitably achieved via an output 27 which is arranged in the lower part of the bottom section.

As is indicated by the arrows, the gases leaving the chamber 3 will pass out of the orifice section 5 and, in doing so, affect the ring gap 9, between the tipping chute 6 and the ring-shaped element 5A, so that a lower pressure arises in the region around the gap (Venturi effect) which causes liquid from the liquid bath to flow into the tipping chute 6. The amount and distribution is regulated by regulating the gap size, which in turn is regulated by raising or lowering the tipping chute 6. The gases with inorganic content leaving the chamber 3 will thus already begin to be mixed with liquid in the tipping chute 6 and rapid cooling and separation of the gas is begun while at the same time depositions on the inside of the tipping chute 6 are avoided. As has already been indicated, this addition of liquid, in the optimum case, counteracts the genesis of "fumes". Once the gas has reached the lower end of the tipping chute 6, it will turn up and ascend upwards along the ring gap which is formed between the tipping chute 6 and the ascending pipe 15. In doing this, the gas will also suck with it some liquid from the space outside the ascending pipe 15 ("mammoth pump effect"), i.e. liquid is sucked in from outside and into the ascending pipe 15 by the liquid being drawn down and in underneath the lower edge of the ascending pipe, which edge is located at a lower level than the corresponding edge of the tipping chute 6. With the aid of the ascending gas, and the liquid mixed in with it, cooling is achieved of the bottom cone 4. Finally the purified gas arrives in the gas pocket 18 and flows out via the pipe conduit for gas removal 17.

Figure 4:
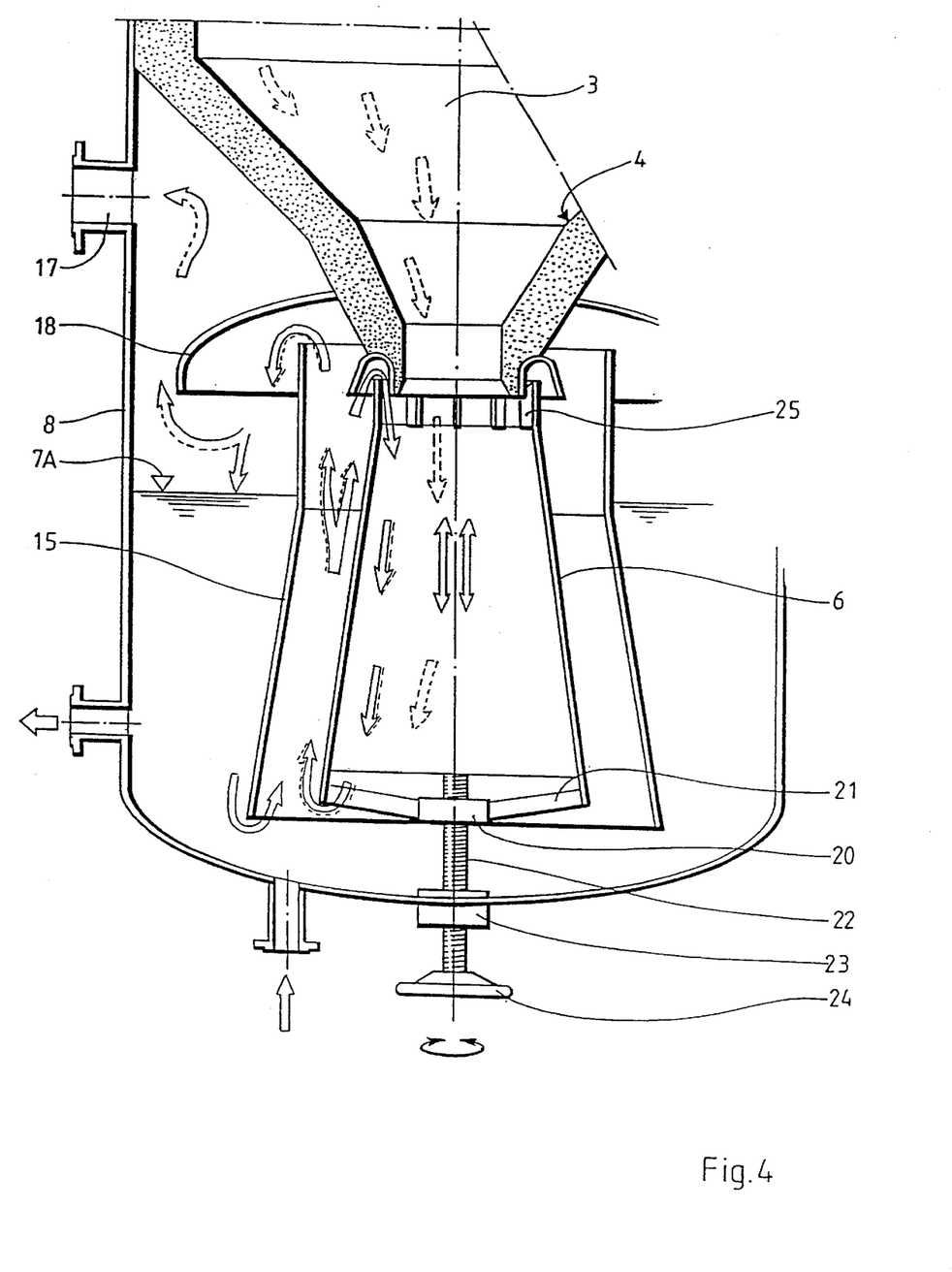
FIG. 4 shows a preferred embodiment of a device according to the invention.

FIG. 4 shows a preferred embodiment of the invention which is somewhat modified in relation to that which is shown in FIG. 3, whereby, instead of a collar extension on the ascending pipe 15, a separate collar baffle 60 is arranged on the bottom section 4 of the reactor. Using this design, the pipe conduit for gas removal 17 can be arranged directly in the mantle 8 at a level above the aforesaid collar 60. Additionally, FIG. 4 shows how a tipping chute 6, in a preferred manner, may be arranged so that it can be raised and lowered. An axle 22 with an operating member 24 is fixed along the centre line 10 with the aid of a stuffing box 23 in the bottom. The axle 22 is engaged with a nut 20 which is fixed inside the tipping chute 6 with the aid of stays 21 in the vicinity of the lower end of the tipping chute 6. Guide bars 25 are arranged on the inside of the upper end of the tipping chute, which guide bars first and foremost have a centering function but also prevent the tipping chute from being rotated around the centre line 10. By turning the operating member 24, it is thus possible to move the tipping chute 6 upwards or downwards.

Figure 5:
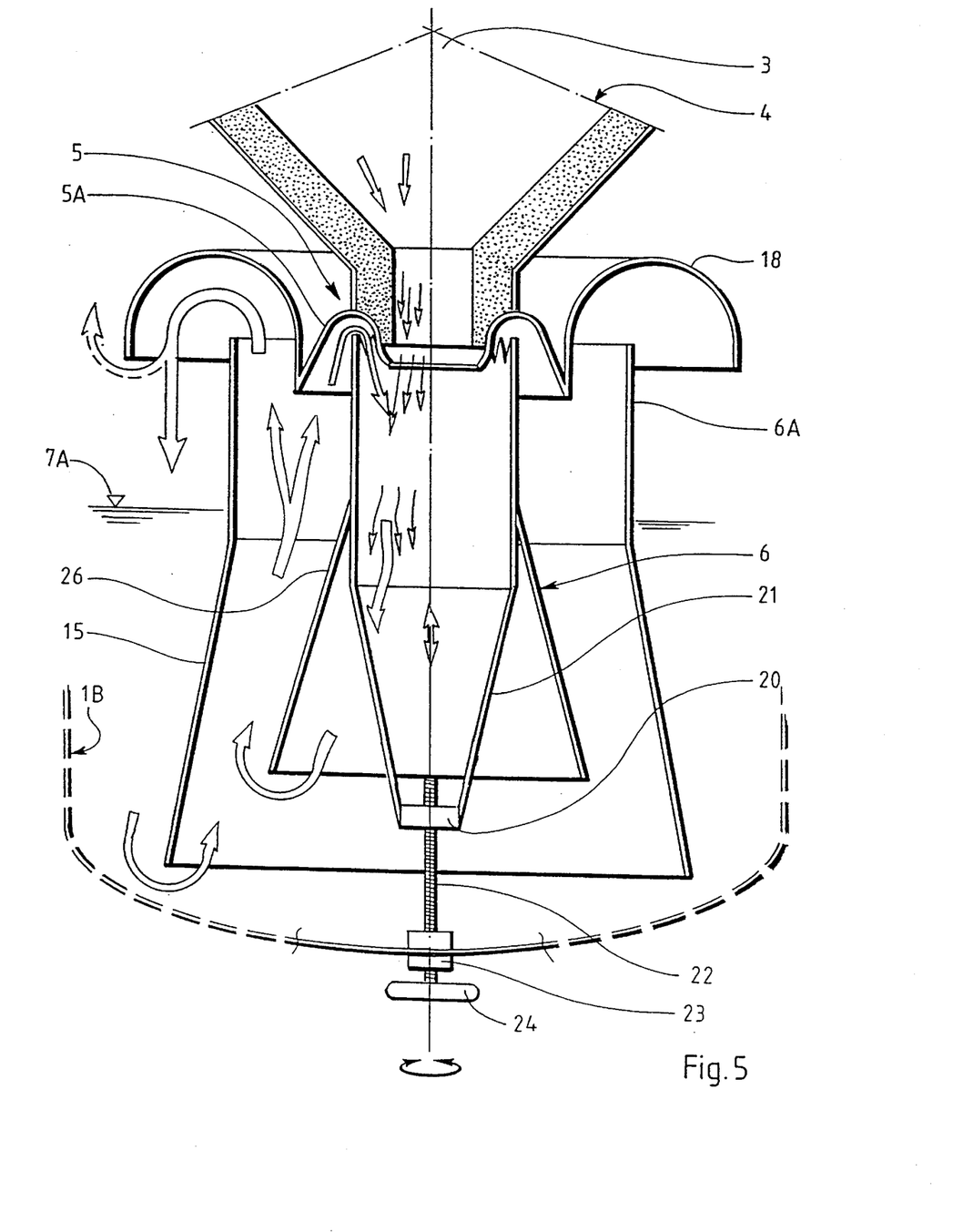
FIG. 5 shows an alternative embodiment of a device according to the invention.

FIG. 5 shows, according to an alternative embodiment, that the collar 60 can be arranged directly on the U-shaped ring orifice element 5A, whereby a predetermined division is obtained of the circulation flow into an outer and an inner flow for rapid cooling in the tipping chute 6.

Additionally it is shown that the tipping chute 6 is divided into a fixed part 26 (fixed either to the ascending pipe 15 or to the mantle 8) and a movable, upper part 6A. Using this arrangement, the lower edge of the tipping chute 6 can always be kept at an optimal distance with respect to the lower edge of the ascending pipe, independently of the optimal gap width at the reactor orifice 5. In addition, centering of the movable upper part 6A is obtained in a relatively simple manner.

Figure 6:
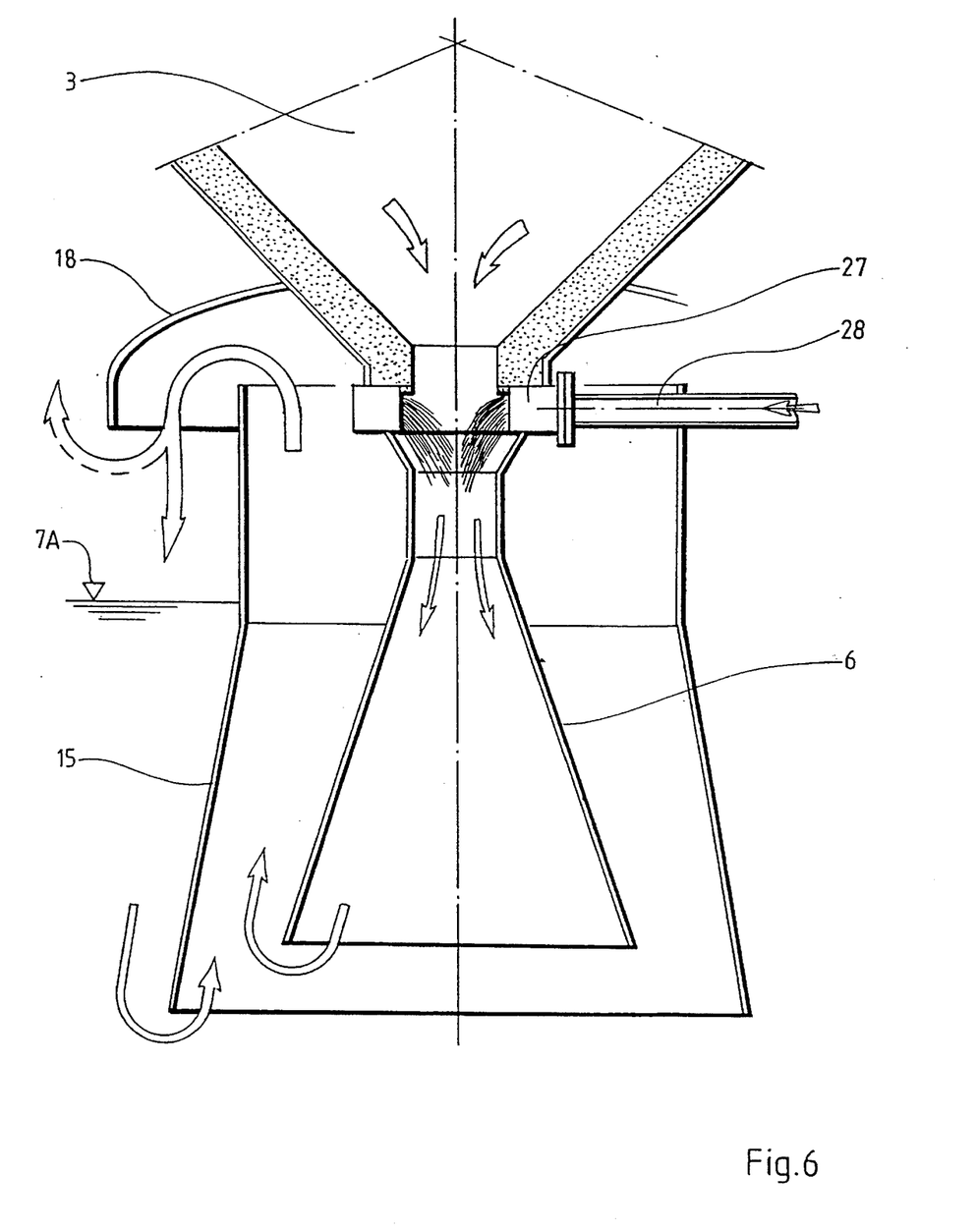
FIG. 6 shows a modified design of a device for gasification of black liquor.

FIG. 6 shows a modified embodiment of a tipping chute according to the invention where the tipping chute 6 is fixed in relation to remaining parts and is designed to be supplied with external liquid, with quench cooling, by means of a nozzle ring 27 which is fed with liquid via a conduit 28 coming from the outside. However, in this example too, the cooling of the bottom cone 4 is achieved in accordance with that which has previously been described.

Figure 7:
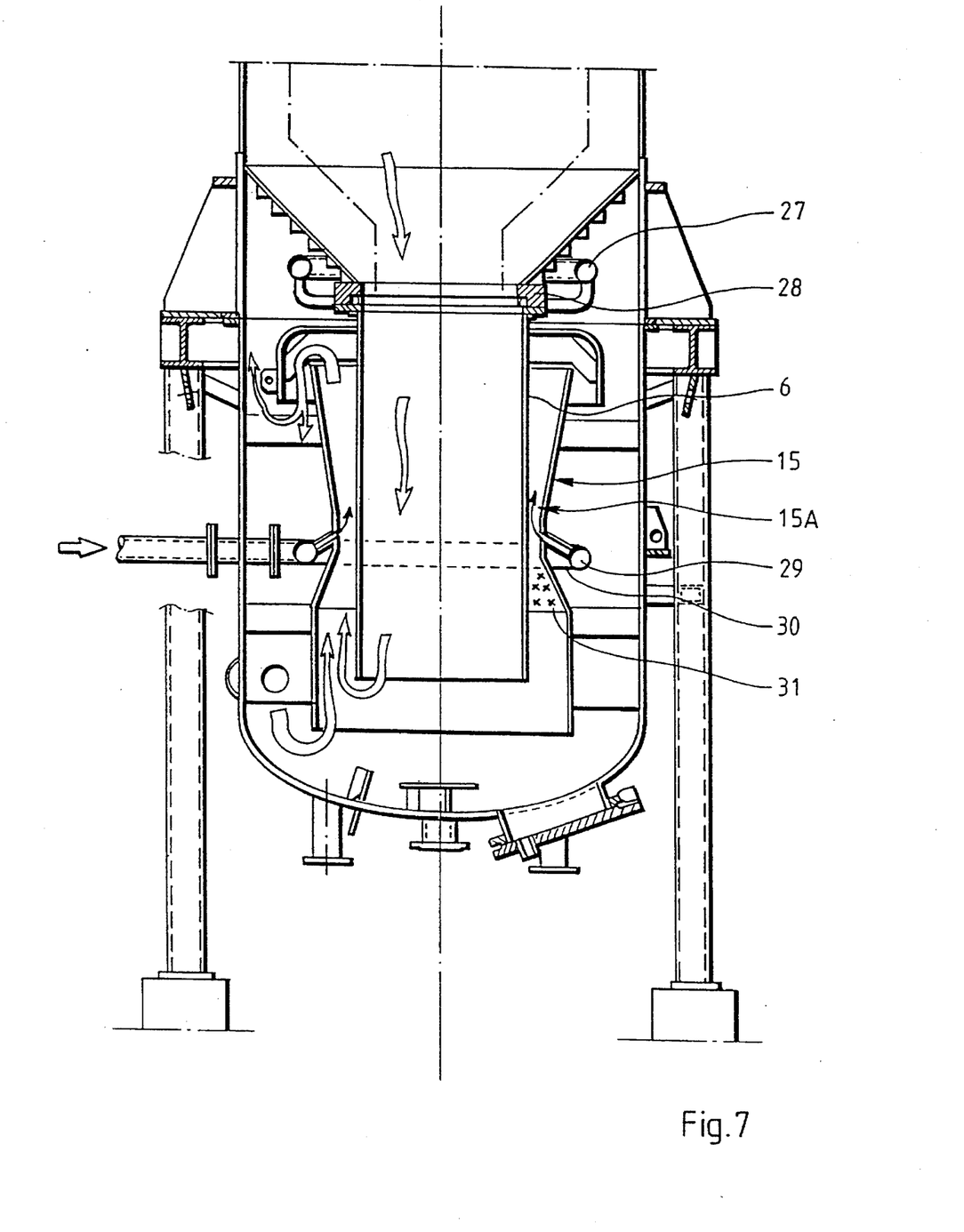
FIG. 7 shows a further alternative embodiment.

As has previously been pointed out, one of the objects of the invention is to improve the dissolution ability of the inorganic particles in the combustible gas in a controllable manner. FIG. 7 shows an embodiment which has the object of improving this ability still further, in which nozzle ring 27 and conduit 28 are provided as in FIG. 6. In the vicinity of its middle section, the ascending pipe 15 is shaped so that the flow-through area along a limited section 15A is substantially narrower than at other sections of the space between ascending pipe 15 and tipping chute 6. This shape elicits turbulence which leads to faster dissolution and cooling of the inorganic particles in the liquid. Additionally, the figure shows that, in the preferred embodiment, provision can be made for adding further liquid, by means of an intake conduit 29 and the multiplicity of inlet pipes 30, at the narrower limited 15A. In order to increase dissolution ability still further, it is proposed, in accordance with this embodiment, that static mixer elements 31 be arranged between ascending pipe 15 and tipping chute 6. These mixer elements may advantageously be shaped in accordance with the description given in Chemical Engineering, July 1989, page 137, ff. "Better Absorption? Try a static mixer", i.e. a static mixer according to one of the four general alternatives dual-blade, corrugated-plate, intersecting-bar or helical, which therefore consist of plates arranged in a special manner and/or bars which, because of their mutual orientation, force the gas and/or liquid to move in a particular manner.

It will be evident to the person skilled in the art that the quench devices shown previously may also be equipped with such static mixers, if this is required.

Figures 8, 9:
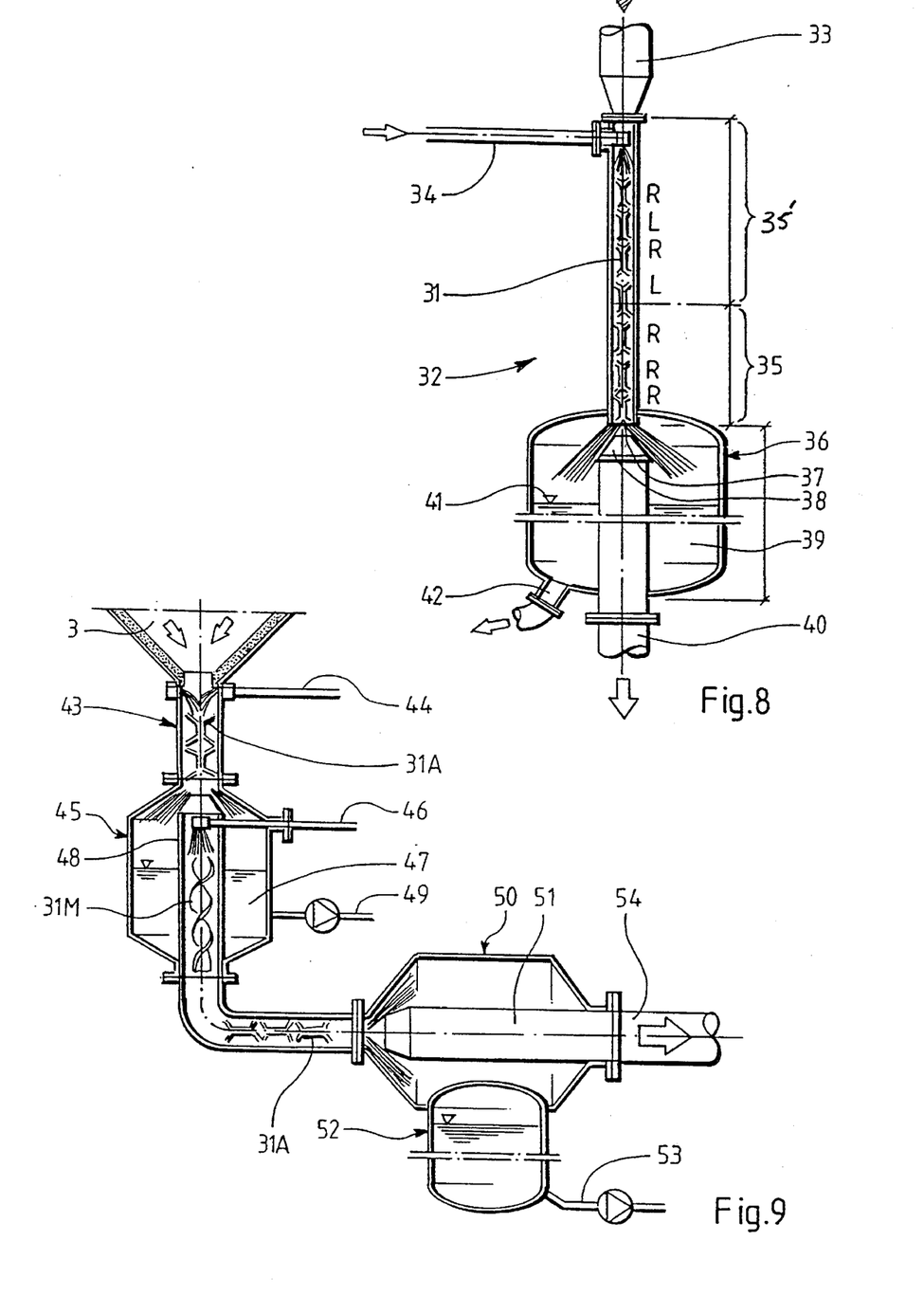
FIG. 8 shows a gas/liquid scrubber intended to be coupled to a reactor device according to the invention.
FIG. 9 shows a further gas/liquid scrubber device.

FIG. 8 shows a gas/liquid scrubber 32 designed to be used in some stage after a previously described reactor with a view to purifying the gas to the extremely low levels which are necessary in connection with gas turbine operation. Like the quench solution shown in FIG. 7, this scrubber is constructed with the aid of static mixer elements 31. The scrubber consists of an inlet arrangement 33 for combustible gas and an inlet arrangement 62 for the addition of liquid. Both these inlet arrangements 33, 62 discharge in the upper end of a long pipe 34, 35. The previously mentioned static mixer elements 31 are arranged inside this pipe. The lower part of the scrubber comprises an outer housing 36 inside which the pipe 34, 35 discharges 37, and inside which a liquid bath 39 is arranged together with outlet members for gas and liquid, 40 and 42 respectively. The outlet member 40 for the gas is attached to a pipe part 38 which possesses openings above the liquid level 41 in the outlet housing 36. The static mixer elements 31 are arranged in the upper part in such a way that the direction of flow is reversed on several occasions while in the lower part of long pipe 35, mixing elements 31 are arranged which continuously conduct the gas flow in the same direction of rotation, thereby causing the liquid and other heavier particles to be centrifuged out towards the periphery. The scrubber thus functions in such a way that the hot gases enter the inlet 33 and into the upper part of the long pipe 34 where the gases are brought into contact with a liquid, preferably an alkaline liquid for absorption of $H_2S$, during a short but intensive exposure. The gas contains, inter alia, $H_2S$, $CO_2$, "fumes" and liquid drops. Mixing and scrubbing thus takes place in the upper part of the long pipe 34, during which the inorganic part of the gas is dissolved in the liquid which has been supplied. In the lower part of the long pipe 35, liquid and other heavier particles will then be separated from the gas due to centrifugal force. This liquid and heavier particles then fall down into the liquid bath 39 while the purified and dry gas flows in through the suitably disposed orifices which are present above the liquid level 41. Thereafter the gas is drawn off through the outlet member 40 arranged at the bottom and the liquid is separately drawn off through the outlet member 42.

FIG. 9 shows a further embodiment in which static separator/mixer elements 31A, 31M are used. Here, a first separation of the gas leaving the lower part of the reactor 3 takes place in the first separation section 43 with separator elements 31A. A powerful addition of liquid takes place through liquid supply 44 in conjunction with the reactor outlet, which liquid cools the gas and condenses out inorganic components which, together with the liquid, are forced to rotate by means of the separator elements 31A so that they are separated from the gas stream due to the centrifugal force. The liquid 47 is collected in a vessel 45 from which it can be led away via a conduit 49, so that the quantity of liquid can be kept constant. The gas continues into a pipe 48, containing a scrubber with liquid addition through liquid supply 46; and mixer elements 31M, in which gas and liquid are brought into intimate contact by continuous changes in direction which are caused by the mixer elements 31M. After that, a second separation takes place in a subsequent vessel 50, once again by means of separator elements 31A. The purified gas is then received in pipe 51 taken out via a pipe 54 while the liquid which has been separated off is collected in a container 52 with an outlet conduit 53. Liquid from this container 52, like that from the first vessel 45, may advantageously be used as an addition to one of the supplies 44, 46. By means of this approach, different concentrations of chemicals can be obtained in a selective manner in the drawn-off liquids, thereby facilitating optimal chemical recovery.

It will be evident to the person skilled in the art that the invention is not limited by that which has been described above, but can be varied within the scope of the subsequent patent claims. Thus it is obvious that the gap can be formed in another manner, for example by having the tipping chute 6 flexibly arranged at one edge of the reactor orifice. A further method would be to have a movable casing arranged on the outside of the upper part of the tipping chute, and consequently, by moving the said casing up or down, the gap 9 between tipping chute and orifice section 5 can be regulated. Other conceivable embodiments are overlapping perforated rings, which, at different relative positions, expose continuous openings of varying size which permit communication between the liquid bath and the inside of the tipping chute. Furthermore, it is obvious that other methods can be used for moving the tipping chute than that which has been shown, for example hydraulics, pneumatics, pinion and rack etc.

I claim:

1. A device for thermally decomposing stock, comprising:

a reactor having a chamber in which thermal decomposition takes place, said chamber having an outlet; and a separation zone comprising a housing containing a liquid bath for separating out components contained in a gas stream leaving the chamber, and a tipping chute;

wherein said tipping chute has a first and a second end, said first end being disposed adjacent said outlet of the chamber, said second end being disposed within the housing for containing the liquid bath; and wherein a cross-sectional area of said second end of said tipping chute is larger than a cross-sectional area of said first end of said tipping chute.

2. The device of claim 1, further comprising:

means for injecting cooling liquid into the gas stream at approximately a most narrow portion of said tipping chute and said outlet.

3. The device of claim 2, wherein said means for injecting cooling liquid is constructed and arranged to add said liquid in the form of one of a downwardly flowing film along the inner surface of the tipping chute and a spray.

4. The device of claim 2, wherein the most narrow portion of said tipping chute and said outlet is formed by an outlet of said reactor.

5. The device of claim 1, wherein the second end of the tipping chute is located at a position which is below a surface level of the liquid bath.

6. The device of claim 1, wherein at least one opening is formed in a wall of the tipping chute, which during operation permits communication between an inside of the tipping chute and liquid from the liquid bath.

7. The device of claim 1, further comprising an ascending pipe disposed within the housing and outside the tipping chute.

8. The device of claim 1, wherein a portion of the tipping chute increases conically in cross-section.

9. The device according to claim 8, wherein the means for injecting cooling liquid is positioned above the portion of the tipping chute which increases in cross-sectional area.

* * * * *